(12) United States Patent
Chiu et al.

(10) Patent No.: US 10,659,279 B2
(45) Date of Patent: May 19, 2020

(54) METHOD AND DEVICE FOR DISPLAYING VIDEO CORRESPONDING TO PHYSICAL OBJECT

(71) Applicant: HTC Corporation, Taoyuan (TW)

(72) Inventors: Wei-Cheng Chiu, Taoyuan (TW); Wei-Chih Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/654,733

(22) Filed: Jul. 20, 2017

(65) Prior Publication Data
US 2018/0097681 A1    Apr. 5, 2018

Related U.S. Application Data

(60) Provisional application No. 62/403,724, filed on Oct. 4, 2016, provisional application No. 62/415,522, filed on Nov. 1, 2016.

(51) Int. Cl.
| | |
|---|---|
| *G06T 19/00* | (2011.01) |
| *H04L 29/06* | (2006.01) |
| *G06F 3/01* | (2006.01) |
| *H04N 5/232* | (2006.01) |

(52) U.S. Cl.
CPC ........ *H04L 29/06401* (2013.01); *G06F 3/011* (2013.01); *G06T 19/006* (2013.01); *H04L 29/0651* (2013.01); *H04N 5/232* (2013.01)

(58) Field of Classification Search
None
See application file for complete search history.

(56) References Cited

U.S. PATENT DOCUMENTS

| 9,746,984 B2 * | 8/2017 | Stafford ................. G06F 3/012 |
| 2012/0089274 A1 | 4/2012 | Lee et al. |
| 2012/0249797 A1 | 10/2012 | Haddick et al. |
| 2015/0149000 A1 * | 5/2015 | Rischmuller ......... B64C 39/024 701/7 |
| 2016/0266579 A1 * | 9/2016 | Chen .................... G05D 1/0038 |
| 2016/0349849 A1 * | 12/2016 | Kwon .................... G06F 3/011 |
| 2017/0205827 A1 * | 7/2017 | Rezvani ............... G05D 1/0022 |

FOREIGN PATENT DOCUMENTS

| CN | 105518576 A | 4/2016 |
| CN | 105704501 A | 6/2016 |
| TW | 200307882 A | 12/2003 |
| TW | 201546755 A | 12/2015 |

OTHER PUBLICATIONS

Hoppe et al., "FlyAR: Augmented Reality Supported Micro Aerial Vehicle Navigation," IEEE, 2014. (Year: 2014).*
Thon et al., "Flying a drone in a museum an augmented-reality cultural serious game in Provence", IEEE, 2013. (Year: 2013).*
Corresponding Taiwan office action dated Jan. 24, 2018.
Corresponding Chinese office action dated Jun. 28, 2019.

* cited by examiner

*Primary Examiner* — Nicholas R Wilson
(74) *Attorney, Agent, or Firm* — CKC & Partners Co., LLC

(57) ABSTRACT

A processing method includes acquiring a real-time video captured by a camera disposed on an physical object; acquiring one or more of a moving direction of the physical object, a speed of the physical object, and an acceleration of the physical object; and controlling a display device to display the real-time video corresponding to a first event in response to the first event be triggered according to the one or more of the moving direction of the physical object, the speed of the physical object, and the acceleration of the physical object.

9 Claims, 6 Drawing Sheets

METHOD AND DEVICE FOR DISPLAYING VIDEO CORRESPONDING TO PHYSICAL OBJECT

RELATED APPLICATIONS

This application claims priority to U.S. Provisional Application Ser. No. 62/403,724, filed Oct. 4, 2016 and U.S. Provisional Application Ser. No. 62/415,522, filed Nov. 1, 2016, which are herein incorporated by reference.

BACKGROUND

Technical Field

The present disclosure relates to a device and a method. More particularly, the present disclosure relates to an electronic device and a method for displaying a video corresponding to a physical object.

Description of Related Art

With advances in technology, electronic devices, such as virtual reality (VR) devices, are being increasingly used.

In some applications, a VR processing device may acquire positions of a VR helmet and a VR controller. The VR processing device may control the VR helmet to display a VR scene corresponding to the positions of VR helmet and the VR controller.

SUMMARY

One aspect of the present disclosure is related to a method. In accordance with one embodiment of the present disclosure, the method includes acquiring a real-time video captured by a camera disposed on an physical object; acquiring one or more of a moving direction of the physical object, a speed of the physical object, and an acceleration of the physical object; and controlling a display device to display the real-time video corresponding to a first event in response to the first event be triggered according to the one or more of the moving direction of the physical object, the speed of the physical object, and the acceleration of the physical object.

Another aspect of the present disclosure is related to an electronic device. In accordance with one embodiment of the present disclosure, the electronic device includes one or more processing components, memory, and one or more programs. The memory is electrically connected to the one or more processing components. The one or more programs are stored in the memory and configured to be executed by the one or more processing components. The one or more programs include instructions for acquiring a real-time video captured by a camera disposed on an physical object; acquiring one or more of a moving direction of the physical object, a speed of the physical object, and an acceleration of the physical object; and controlling a display device to display the real-time video corresponding to a first event in response to the first event be triggered according to the one or more of the moving direction of the physical object, the speed of the physical object, and the acceleration of the physical object.

Another aspect of the present disclosure is related to an electronic device. In accordance with one embodiment of the present disclosure, the electronic device includes one or more processing components, memory, and one or more programs. The memory is electrically connected to the one or more processing components. The one or more programs are stored in the memory and configured to be executed by the one or more processing components. The one or more programs include instructions for controlling a first display device to display a first virtual scene corresponding to a physical object, and controlling a second display device to display a second virtual scene corresponding to the physical object. The first virtual scene is different from the second virtual scene.

Through the operations in one embodiment described above, the display device can display the real-time video corresponding to the first event, so that the electronic device can have an expanded number of applications.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
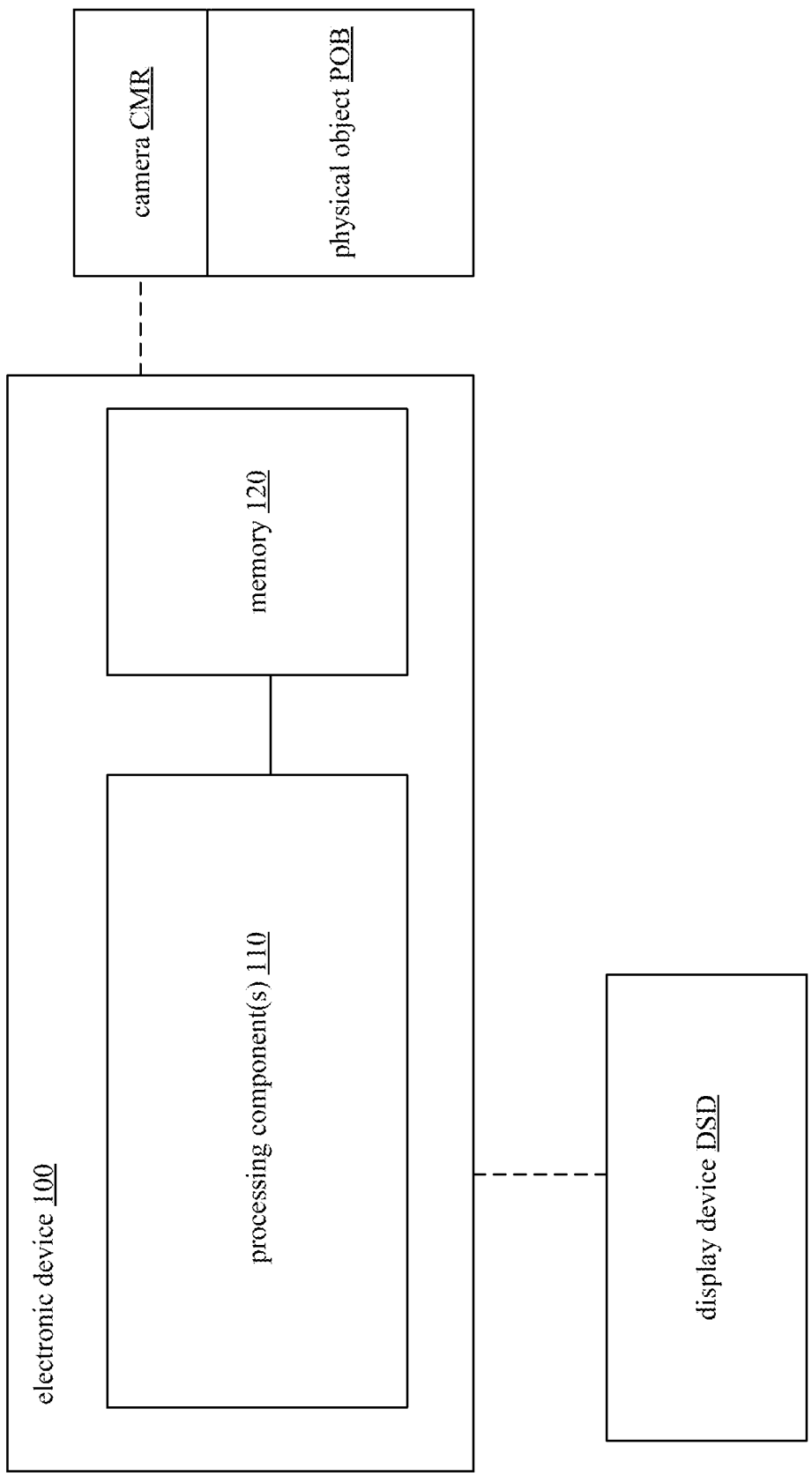
FIG. 1 is a schematic block diagram of an electronic device in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "electrically connected" or "electrically coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having,"

"contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, the terms "around," "about," "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around," "about," "approximately" or "substantially" can be inferred if not expressly stated, or meaning other approximate values.

It will be understood that, in the description herein and throughout the claims that follow, the meaning of "a," "an," and "the" includes reference to the plural unless the context clearly dictates otherwise.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

One aspect of the present disclosure is related to an electronic device. In the paragraphs below, a virtual reality (VR) processing may take as an example to facilitate the description of the electronic device. However, another electronic device, such as an augmented reality (AR) device, a smart phone, or a desktop computer, is within the contemplated scope of the present disclosure.

FIG. 1 is a schematic block diagram of an electronic device 100 in accordance with one embodiment of the present disclosure. In this embodiment, the electronic device 100 includes one or more processing components 110 and a memory 120. In this embodiment, the processing component 110 is electrically connected to the memory 120.

In one embodiment, the one or more processing components 110 can be realized by, for example, one or more processors, such as central processors and/or microprocessors, but are not limited in this regard. In one embodiment, the memory 120 includes one or more memory devices, each of which comprises, or a plurality of which collectively comprise a computer readable storage medium. The memory 120 may include a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In one embodiment, the one or more processing components 110 may run or execute various software programs and/or sets of instructions stored in the memory 120 to perform various functions for the electronic device 100 and to process data.

In one embodiment, the electronic device 100 communicates with a display device DSD via a wire or a wireless connection. In one embodiment, the electronic device 100 communicates with a camera CMR disposed on a physical object POB (e.g., a device) or communicates with the physical object POB. In one embodiment, the electronic device 100 communicates with the camera CMR or the physical object POB via a wire or a wireless connection.

In one embodiment, the electronic device 100 may be realized by using, for example, a VR processing device or a computer. In one embodiment, the display device DSD may be realized by using, for example, a VR helmet or a monitor. In one embodiment, the physical object POB may be realized by using, for example, a car or an unmanned aircraft.

It should be noted that the ways in which the devices and components in the electronic device 100 or interacting with the electronic device 100 realized are not limited by the embodiments described above. In addition, the connections among these devices and components are not limited by the embodiments described above. Any configuration of these devices and components and interconnections there among that would enable the electronic device 100 to practice the technical features described below and/or in the claims can be used herein.

In one embodiment, the one or more processing components 110 acquire a real-time video captured by the camera CMR. In one embodiment, the one or more processing components 110 acquire one or more of a moving direction of the physical object POB, a speed of the physical object POB, and an acceleration of the physical object POB. In one embodiment, the one or more processing components 110 determine whether to trigger an event according to the one or more of the moving direction of the physical object POB, the speed of the physical object POB, and the acceleration of the physical object POB. In one embodiment, in response to the event be triggered, the one or more processing components 110 control the display device DSD to display the real-time video corresponding to the event.

For example, when a warning event is triggered in response to a variation of the acceleration of the physical object POB is equal to or greater than a variation threshold, the one or more processing components 110 control the display device DSD to display the real-time video with a warning message or a red background.

Through the operations in one embodiment described above, a user can watch the real-time video corresponding to the event, so that the electronic device 100 can have an expanded number of applications.

Details of the present disclosure are described in the paragraphs below with reference to a processing method in FIG. 2. However, the present disclosure is not limited to the embodiment below.

It should be noted that the processing method can be applied to an electronic device having a structure that is the same as or similar to the structure of the electronic 100 shown in FIG. 1. To simplify the description below, in the following paragraphs, the embodiment shown in FIG. 1 will be used as an example to describe the processing method according to an embodiment of the present disclosure. However, the present disclosure is not limited to application to the embodiment shown in FIG. 1.

It should be noted that, in some embodiments, the processing method may be implemented as a computer program. When the computer program is executed by a computer or the electronic device in FIG. 1, this executing device performs the processing method. The computer program can be stored in a non-transitory computer readable medium such as a ROM (read-only memory), a flash memory, a floppy disc, a hard disc, an optical disc, a flash disc, a tape, a database accessible from a network, or any storage medium with the same functionality that can be contemplated by persons of ordinary skill in the art to which this invention pertains.

In addition, it should be noted that in the operations of the following processing method, no particular sequence is required unless otherwise specified. Moreover, the following operations also may be performed simultaneously or the execution times thereof may at least partially overlap.

Furthermore, the operations of the following processing method may be added to, replaced, and/or eliminated as appropriate, in accordance with various embodiments of the present disclosure.

Figure 2:
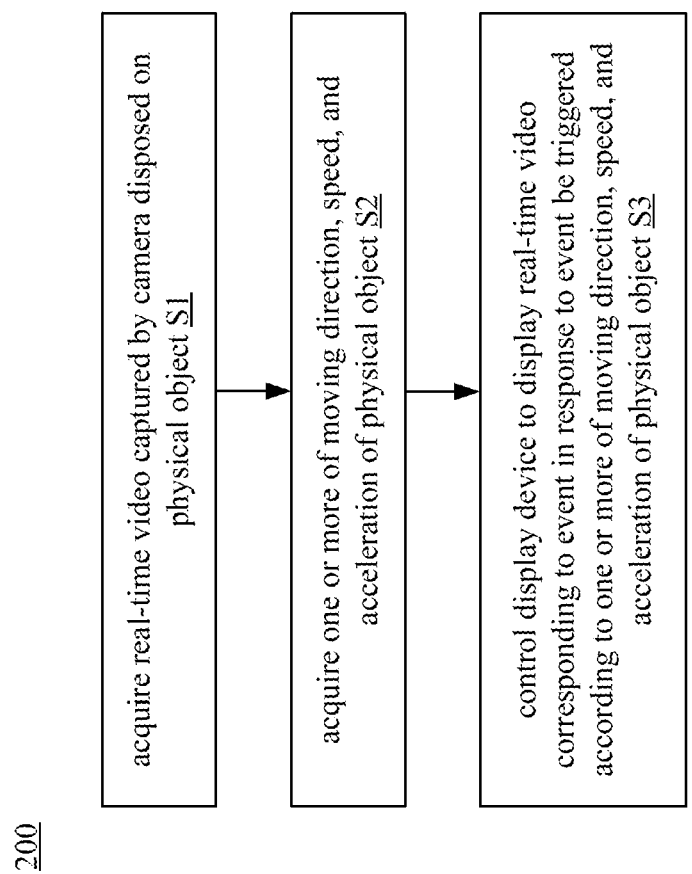
FIG. 2 is a flowchart of a processing method in accordance with one embodiment of the present disclosure.

Reference is made to FIGS. 1 and 2. The processing method 200 includes the operations below.

In operation S1, the one or more processing components 110 acquire a real-time video captured by the camera CMR disposed on the physical object POB. In one embodiment, the camera CMR transmits the real-time video to the electronic device 100 via a connection between the electronic device 100 and the camera CMR. In one embodiment, the camera CMR transmits the real-time video to the electronic device 100 via a connection between the electronic device 100 and the physical object POB.

In operation S2, the one or more processing components 110 acquire one or more of a moving direction of the physical object POB, a speed of the physical object POB, and an acceleration of the physical object POB.

In one embodiment, the one or more processing components 110 calculate the one or more of the moving direction of the physical object POB, the speed of the physical object FOB, and the acceleration of the physical object POB according to positions of the physical object POB. In one embodiment, the one or more processing components 110 acquire the positions of the physical object POB from positioning device(s) or the physical object POB.

In one embodiment, the positions of the physical object POB may be acquired by using a light sensor. In one embodiment, there are lighthouse base stations disposed in a space where the physical object POB located. The physical object FOB may receive lights from the lighthouse base stations by a light sensor for positioning itself. Subsequently, the physical object POB may transmit a current position of itself to the one or more processing components 110, so that the one or more processing components 110 are able to acquire the positions of the physical object POB at different time points. In one embodiment, the physical object POB may be realized by using a device with a lighthouse sensor. It should be noted that, another positioning method is within the contemplated scope of the present disclosure.

In one embodiment, the one or more processing components 110 acquire the one or more of the moving direction of the physical object POB, the speed of the physical object, and the acceleration of the physical object by using one or more inertial measurement unit (IMU) sensors. In one embodiment, the one or more IMU sensors may be disposed on the physical object POB. In one embodiment, the one or more IMU sensors may include one or more of gyrometers and accelerometers, but the present disclosure is not limited in this regard.

In one embodiment, the one or more processing components 110 acquire the one or more of the moving direction of the physical object POB, the speed of the physical object FOB, and the acceleration of the physical object POB through both of the light sensor and the one or more IMU sensors described above.

In operation S3, the one or more processing components 110 control the display device DSD to display the real-time video corresponding to an event in response to the event be triggered. In one embodiment, the event is triggered according to the one or more of the moving direction of the physical object POB, the speed of the physical object FOB, and the acceleration of the physical object POB.

In one embodiment, the one or more processing components 110 may trigger the event in response to one or more of the moving direction of the physical object POB reach a direction threshold, the speed of the physical object POB reach a speed threshold, the acceleration of the physical object POB reach an acceleration threshold, a variation of the moving direction of the physical object POB reach a first variation threshold, a variation of the speed of the physical object FOB reach a second variation threshold, and a variation of the acceleration of the physical object POB reach a third variation threshold.

For example, in response to the acceleration of the physical object POB reach +0.5 m/sec$^2$, and the variation of the speed of the physical object POB is greater than 1 m/sec, the one or more processing components 110 trigger a first event. In response to the moving direction of the physical object POB reach −0.5 m/sec$^2$, and the variation of the speed of the physical object POB is greater than 1 m/sec, the one or more processing components 110 trigger a second event which is different from the first event.

Through the operations in one embodiment described above, a user can watch the real-time video corresponding to the moving status of the physical object POB, so that the electronic device 100 can have an expanded number of applications.

Figure 3:
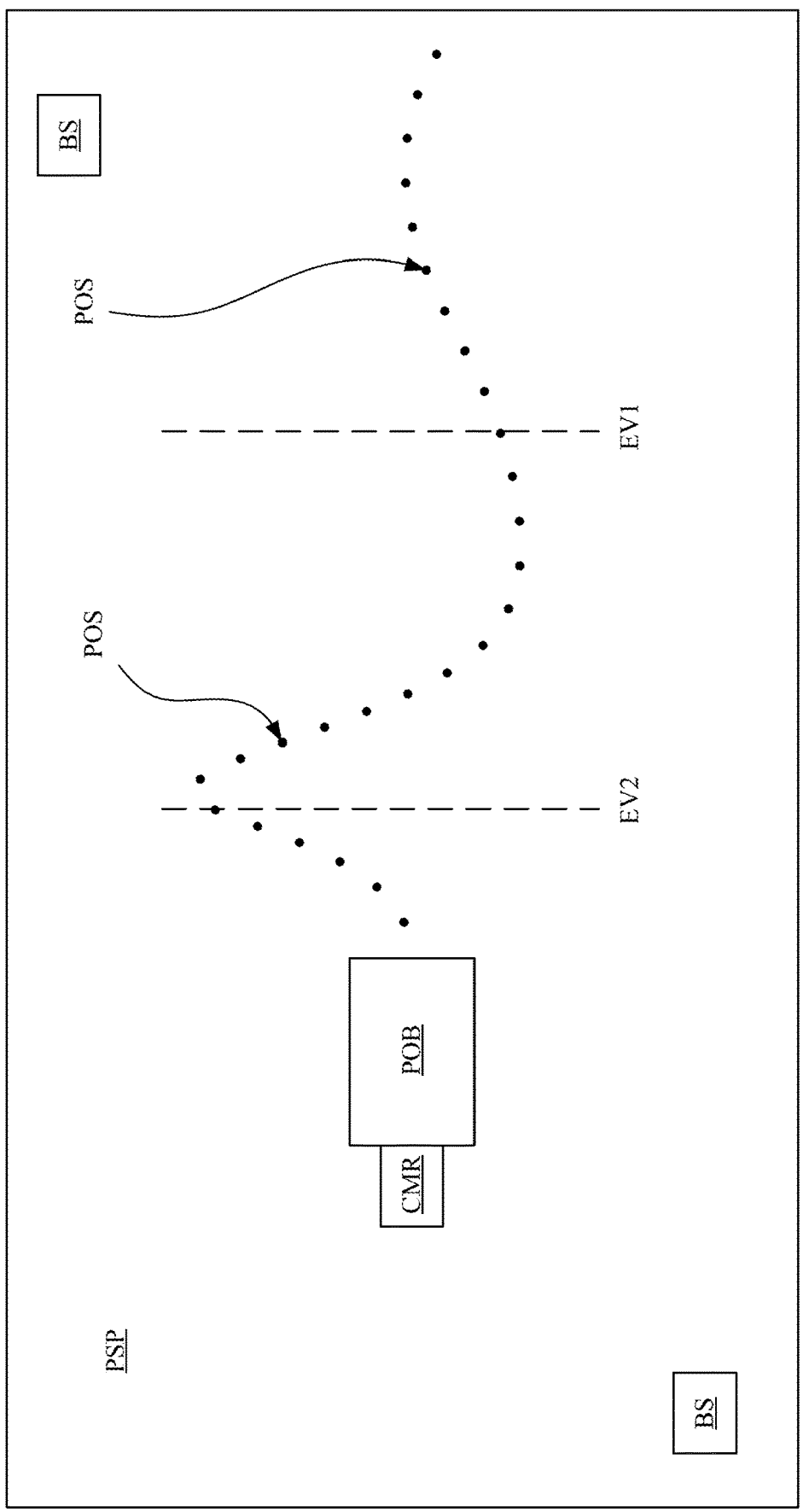
FIG. 3 illustrates an illustrative example of the processing method in accordance with one embodiment of the present disclosure.

To allow the disclosure to be more fully understood, an operative example is described in the paragraphs below with reference to FIG. 3, but the present disclosure is not limited to the example below.

In this example, the physical object POB (e.g., a mini 4wd car) and base stations BS are within an identical physical space PSP. In this example, the base stations BS emit lights, and the physical object POB detect the positions POS thereof at each time points by sensing the lights with a light sensor disposed thereon. In this example, the camera CMR disposed on the physical object POB captures a real-time video in a period corresponding to the time points.

In this example, the one or more processing components 110 acquire the positions POS of the physical object POB and acquire one or more of the moving direction of the physical object POB, the speed of the physical object POB, and the acceleration of the physical object FOB according to the positions POS of the physical object POB.

In this example, the one or more processing components 110 trigger a first event EV1 (e.g., an overspeed event) at a first time point in response to the speed of the physical object FOB reach a speed threshold. At this time, the one or more processing components 110 control the display device DSD to display the real-time video corresponding to the first time point with a message in related to the first event EV1 (e.g., an overspeed message).

Additional, in this example, the one or more processing components 110 trigger a second event EV2 (e.g., an overturn risk event) at a second time point in response to a variation of the moving direction of the physical object POB reach a variation threshold and the speed of the physical object POB reach a speed threshold. At this time, the one or more processing components 110 control the display device DSD to display the real-time video corresponding to the second time point with a red background to indicate that the physical object POB is in an overturn risk.

In one embodiment of the present disclosure, the one or more processing components 110 may trigger an event according to a current position of the physical object POB and the one or more of the moving direction of the physical object, the speed of the physical object, and the acceleration of the physical object.

For example, the one or more processing components 110 may trigger an overturn risk event in response to a variation of the moving direction of the physical object FOB reach a variation threshold and the current position of the physical object POB is within a certain region (e.g., a slippery region).

Through the operations in one embodiment described above, a user can watch the real-time video corresponding to the moving status and the current position of the physical object POB, so that the electronic device 100 can have an expanded number of applications.

Figure 4:
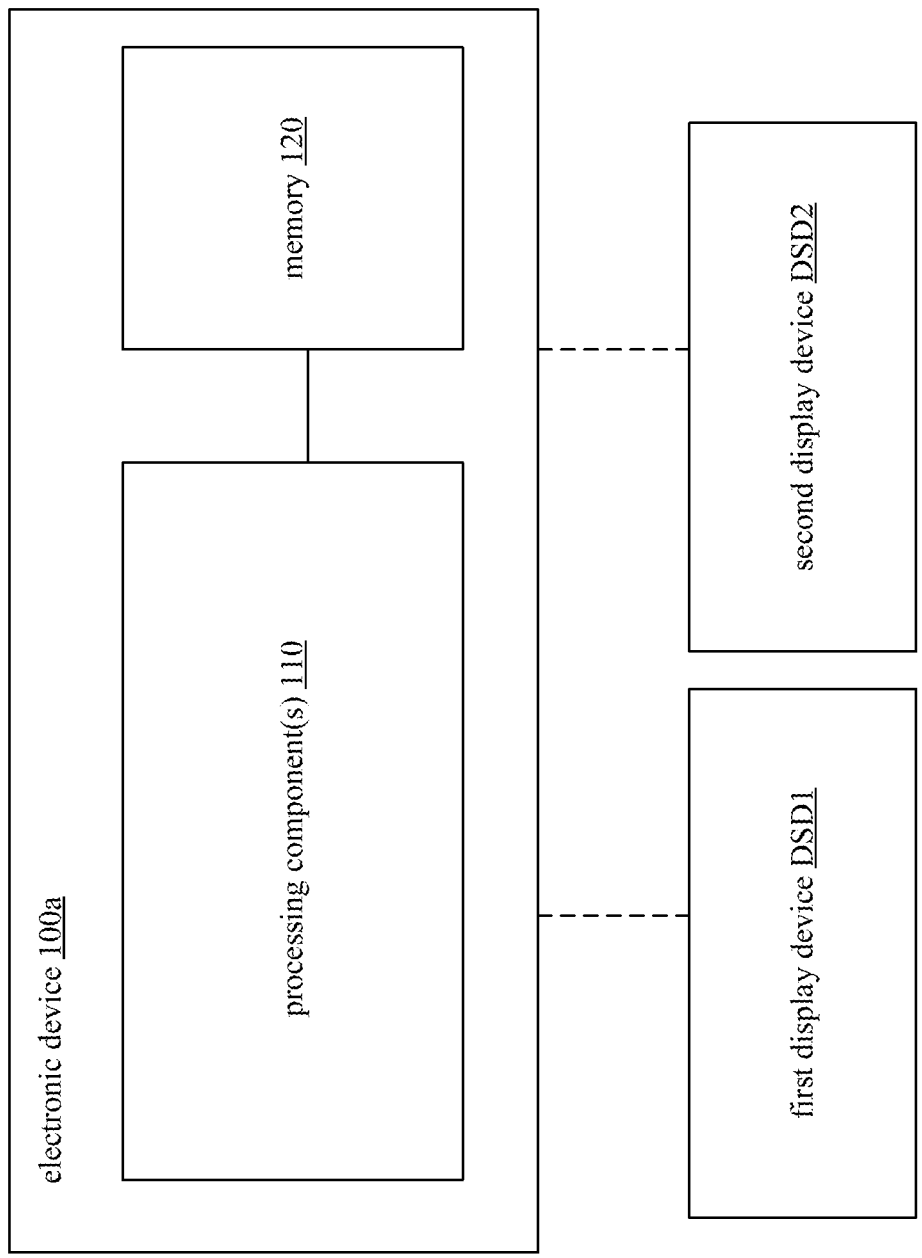
FIG. 4 is a schematic block diagram of an electronic device in accordance with another embodiment of the present disclosure.

Reference is made to FIG. 4, in which FIG. 4 is a schematic block diagram of an electronic device 100a in accordance with another embodiment of the present disclosure. In one embodiment, the electronic device 100a may perform the functions of the electronic device 100 as described above, and a description in this regard can be ascertained with reference to the paragraphs above. In one embodiment, the components of the electronic device 100a may be similar to the components of the electronic device 100, and many aspects in this regard can be ascertained with reference to the paragraphs above.

In this embodiment, the electronic device 100a communicates with different display devices (e.g., a first display device DSD1 and a second display device DSD2). In one embodiment, the electronic device 100a communicates with the first display device DSD1 and the second display device DSD2 via a wire or a wireless connection. In this embodiment, the electronic device 100a receives information of a physical object.

In one embodiment, the electronic device 100a may be realized by using, for example, a VR processing device or a computer. In one embodiment, each of the display devices DSD1, DSD2 may be realized by using, for example, a VR helmet or a monitor. In one embodiment, the physical object may be realized by using, for example, a car or an unmanned aircraft.

It should be noted that the ways in which the devices and components in the electronic device 100a or interacting with the electronic device 100a realized are not limited by the embodiments described above. In addition, the connections among these devices and components are not limited by the embodiments described above. Any configuration of these devices and components and interconnections there among that would enable the electronic device 100a to practice the technical features described below and/or in the claims can be used herein.

In one embodiment, the one or more processing components 110 control the first display device DSD1 to display a first virtual scene (e.g., a monster fight scene) corresponding to the physical object. In one embodiment, the one or more processing components 110 control the second display device DSD2 to display a second virtual scene (e.g., a whack-a-mole scene) corresponding to the physical object.

Through the operations in one embodiment described above, it allows different users to watch different virtual scenes by using the identical electronic device 100a and the identical physical object.

Details of the present disclosure are described in the paragraphs below with reference to a processing method in FIG. 5. However, the present disclosure is not limited to the embodiment below.

It should be noted that the processing method can be applied to an electronic device having a structure that is the same as or similar to the structure of the electronic device 100a shown in FIG. 4. To simplify the description below, in the following paragraphs, the embodiment shown in FIG. 4 will be used as an example to describe the processing method according to an embodiment of the present disclosure. However, the present disclosure is not limited to application to the embodiment shown in FIG. 4.

It should be noted that, in some embodiments, the processing method may be implemented as a computer program. When the computer program is executed by a computer or the electronic device in FIG. 4, this executing device performs the processing method. The computer program can be stored in a non-transitory computer readable medium such as a ROM (read-only memory), a flash memory, a floppy disc, a hard disc, an optical disc, a flash disc, a tape, a database accessible from a network, or any storage medium with the same functionality that can be contemplated by persons of ordinary skill in the art to which this invention pertains.

In addition, it should be noted that in the operations of the following processing method, no particular sequence is required unless otherwise specified. Moreover, the following operations also may be performed simultaneously or the execution times thereof may at least partially overlap.

Furthermore, the operations of the following processing method may be added to, replaced, and/or eliminated as appropriate, in accordance with various embodiments of the present disclosure.

Figure 5:
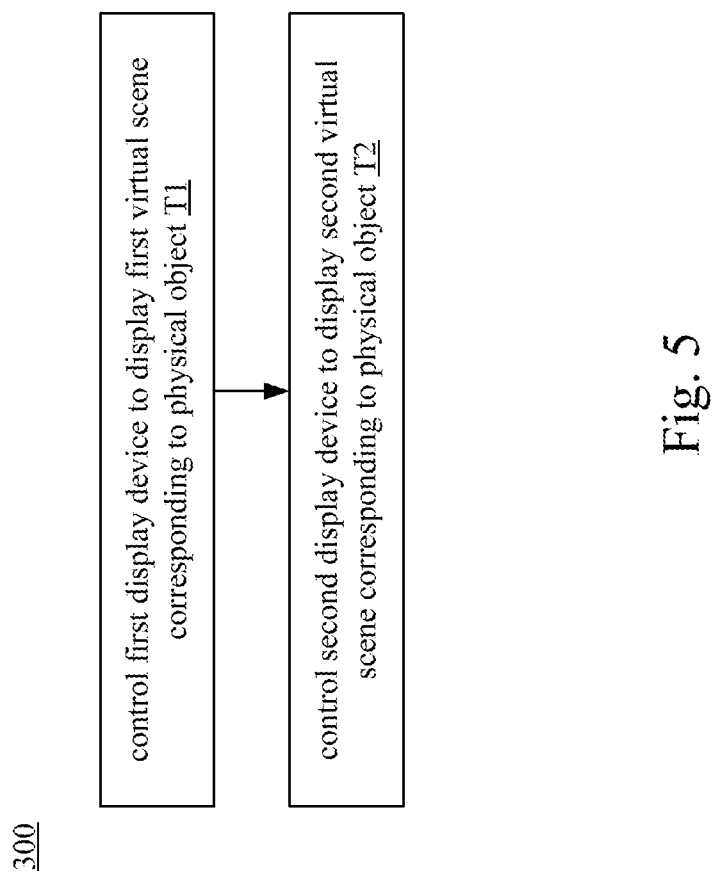
FIG. 5 is a flowchart of a processing method in accordance with another embodiment of the present disclosure.

Reference is made to FIGS. 4 and 5. The processing method 300 includes the operations below.

In operation T1, the one or more processing components 110 control the first display device DSD1 to display a first virtual scene corresponding to the physical object. In one embodiment, the first virtual scene includes a first virtual object in a first virtual environment. In one embodiment, the one or more processing components 110 control the first display device DSD1 to display the first virtual object (e.g., a monster) corresponding to the physical object within the first virtual environment (e.g., outer space).

In one embodiment, the one or more processing components 110 control the first display device DSD1 to display the first virtual scene corresponding to a position of the physical object. For example, a position of the first virtual object in the first virtual environment corresponds to the position of the physical object.

In one embodiment, the one or more processing components 110 acquire the position of the physical object from positioning device(s) or the physical object, and details in this regard can be ascertained with reference to the paragraph above.

In operation T2, the one or more processing components 110 control the second display device DSD2 to display a second virtual scene corresponding to the physical object. In one embodiment, the one or more processing components 110 may concurrently control the first and second display devices DSD1, DSD2 to respectively display the first and second virtual scenes corresponding to the physical object.

In one embodiment, the first virtual scene includes a first virtual object in a first virtual environment. In one embodiment, the one or more processing components 110 control the second display device DSD2 to display the second virtual object (e.g., a mole) corresponding to the physical object within the second virtual environment (e.g., a forest).

In one embodiment, the one or more processing components 110 control the second display device DSD2 to display the second virtual scene corresponding to the position of the physical object. For example, a position of the second virtual object in the second virtual environment corresponds to the position of the physical object.

In one embodiment, the first virtual object is different from or identical to the second virtual object. In one embodiment, the first virtual environment is different from or identical to the second virtual environment. For example, the first virtual object and the second virtual object may be an identical monster, and the first virtual environment (e.g., outer space) may be different from the second virtual environment (e.g., a forest). As another example, the first virtual object (e.g., a monster) may be different from the second virtual object (e.g., a mole), and the first virtual environment and the second virtual environment may be an identical forest. As another example, the first virtual object (e.g., a monster) may be different from the second virtual object (e.g., a mole), and the first virtual environment (e.g., outer space) may be different from the second virtual environment (e.g., a forest).

Figure 6:
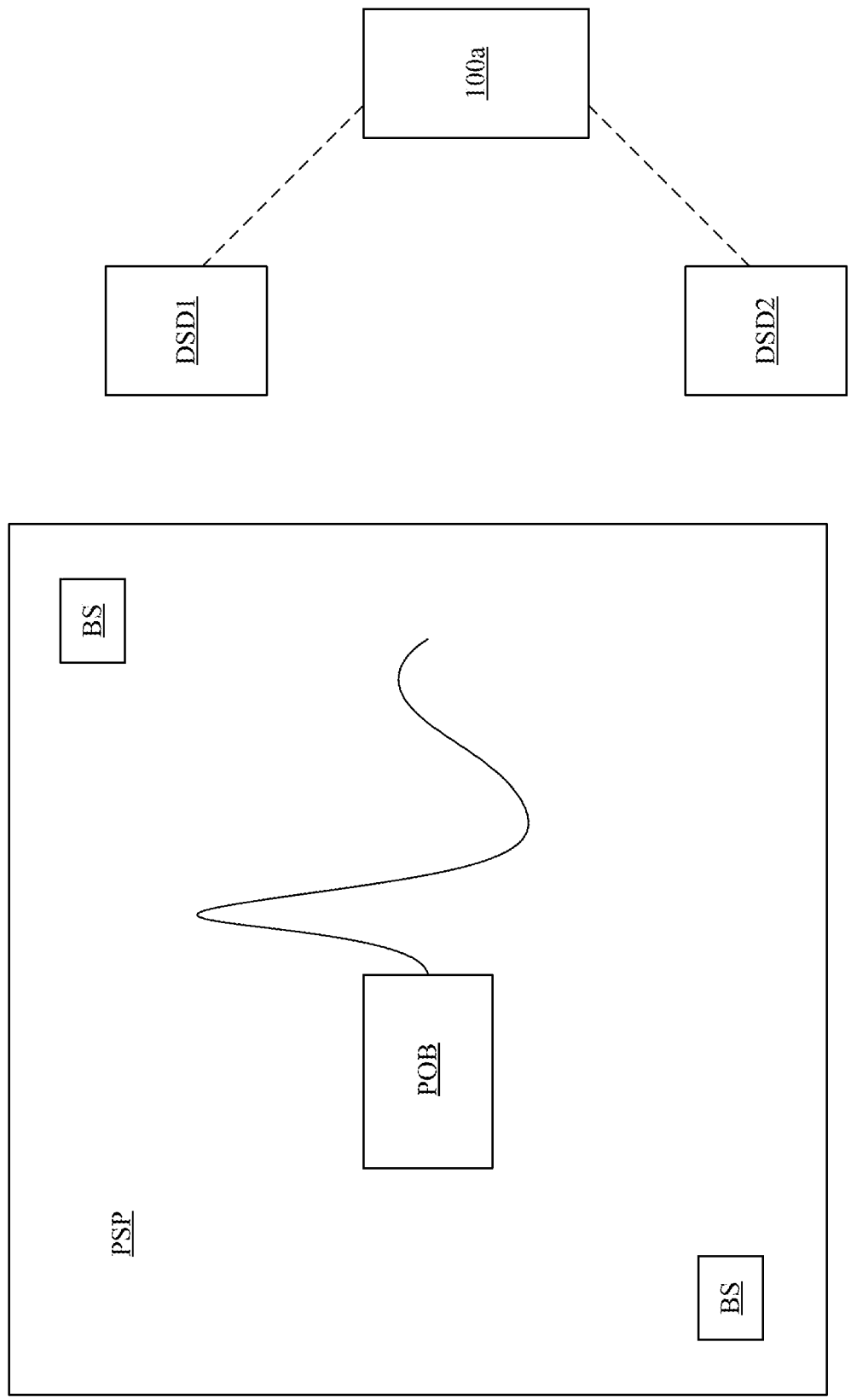
FIG. 6 illustrates an illustrative example of the processing method in accordance with another embodiment of the present disclosure.

To allow the disclosure to be more fully understood, an operative example is described in the paragraphs below with reference to FIG. 6, but the present disclosure is not limited to the example below.

In this example, the physical object POB (e.g., a radio controlled car) and base stations BS are within an identical physical space PSP. In this example, the base stations BS emit lights, and the physical object POB detect the positions POS thereof at each time points by sensing the lights with a light sensor disposed thereon.

In this example, the one or more processing components 110 acquire the position POS of the physical object POB from the physical object POB, and control the first display device DSD1 and the second display device DSD2 to display different scene corresponding to the position POS of the physical object POB.

In this example, the first display device DSD1 display a monster within outer space corresponding to the position of the physical object POB. The second display device DSD2 display a mole within a forest corresponding to the position of the physical object POB.

Through the operations in one embodiment described above, it allows different users to watch different virtual scenes by using the identical electronic device 100a and the identical physical object.

Although the present invention has been described in considerable detail with reference to certain embodiments thereof, other embodiments are possible. Therefore, the scope of the appended claims should not be limited to the description of the embodiments contained herein.

What is claimed is:

1. An electronic device communicating with a first display device and a second display device, the electric device comprising:
   one or more processing components which acquire position information of a physical object in a physical space;
   a memory electrically connected to the one or more processing components; and
   one or more programs, wherein the one or more programs are stored in the memory and configured to be executed by the one or more processing components, the one or more programs comprising instructions for:
   controlling the first display device to display a first virtual reality environment, wherein the first virtual reality environment is different from and not a film of the physical space where the physical object is located;
   controlling the first display device to display a first virtual object in the first virtual reality environment, wherein displaying the first virtual object in the first virtual reality environment comprises displaying a position of the first virtual object in the first virtual reality environment in a manner that corresponds to a position of the physical object in the physical space;
   controlling the second display device to display a second virtual reality environment, wherein the second virtual reality environment is different from and not the film of the physical space where the physical object is located-; and
   controlling the second display device to display a second virtual object in the second virtual reality environment, wherein displaying the second virtual object in the second virtual reality environment comprises displaying a position of the second virtual object in the second virtual reality environment in a manner that corresponds to the position of the physical object in the physical space;
   wherein the second virtual reality environment is different from the first virtual reality environment such that the first display device displays the first virtual reality environment for a first user and the second display device displays the second virtual reality environment for a second user.

2. The electronic device as claimed in claim 1, wherein the first virtual object is different from the second virtual object and the first virtual reality environment is different from the second virtual reality environment.

3. The electronic device as claimed in claim 1, wherein the one or more programs further comprises instructions for:
   controlling the first display device to display the first virtual reality environment corresponding to a position of the physical object; and
   controlling the second display device to display the second virtual reality environment corresponding to the position of the physical object.

4. A method for an electronic device communicating with a first display device and a second display device, the method comprising:
   acquiring position information of a physical object in a physical space;
   controlling the first display device to display a first virtual reality environment, wherein the first virtual reality environment is different from and not a film of the physical space where the physical object is located;

controlling the first display device to display a first virtual object in the first virtual reality environment, wherein displaying the first virtual object in the first virtual reality environment comprises displaying a position of the first virtual object in the first virtual reality environment in a manner that corresponds to a position of the physical object in the physical space;

controlling the second display device to display a second virtual reality environment, wherein the second virtual reality environment is different from and not the film of the physical space where the physical object is located; and controlling the second display device to display a second virtual object in the second virtual reality environment, wherein displaying the second virtual object in the second virtual reality environment comprises displaying a position of the second virtual object in the second virtual reality environment in a manner that corresponds to the position of the physical object in the physical space;

wherein the second virtual reality environment is different from the first virtual reality environment such that the first display device displays the first virtual reality environment for a first user and the second display device displays the second virtual reality environment for a second user.

5. The method of claim 4, wherein the first virtual object is different from the second virtual object and the first virtual reality environment is different from the second virtual reality environment.

6. The method of claim 4, further comprising:
controlling the first display device to display the first virtual reality environment corresponding to a position of the physical object; and
controlling the second display device to display the second virtual reality environment corresponding to the position of the physical object.

7. A non-transitory computer-readable storage medium storing instructions executable by a processor of an electronic device, wherein the instructions are executed to cause the device to:
acquire position information of a physical object in a physical space;

control a first display device to display a first virtual reality environment, wherein the first virtual reality environment is different from and not a film of the physical space where the physical object is located;

control the first display device to display a first virtual object in the first virtual reality environment, wherein displaying the first virtual object in the first virtual reality environment comprises displaying a position of the first virtual object in the first virtual reality environment in a manner that corresponds to a position of the physical object in the physical space;

control a second display device to display a second virtual reality environment, wherein the second virtual reality environment is different from and not the film of the physical space where the physical object is located; and control the second display device to display a second virtual object in the second virtual reality environment, wherein displaying the second virtual object in the second virtual reality environment comprises displaying a position of the second virtual object in the second virtual reality environment in a manner that corresponds to the position of the physical object in the physical space;

wherein the second virtual reality environment is different from the first virtual reality environment such that the first display device displays the first virtual reality environment for a first user and the second display device displays the second virtual reality environment for a second user.

8. The non-transitory computer-readable storage medium of claim 7, wherein the first virtual object is different from the second virtual object and the first virtual reality environment is different from the second virtual reality environment.

9. The non-transitory computer-readable storage medium of claim 7, wherein the instructions are further executed to cause the device to:
control the first display device to display the first virtual reality environment corresponding to a position of the physical object; and
control the second display device to display the second virtual reality environment corresponding to the position of the physical object.

* * * * *